US012568896B2

(12) United States Patent
Sabin et al.

(10) Patent No.: US 12,568,896 B2
(45) Date of Patent: Mar. 10, 2026

(54) STACKABLE MODULAR PLANTER

(71) Applicants: Richard Alexander Sabin, Bosham (GB); Mark Andrew Fleming, Bosham (GB)

(72) Inventors: Richard Alexander Sabin, Bosham (GB); Mark Andrew Fleming, Bosham (GB)

( * ) Notice: Subject to any disclaimer, the term of this patent is extended or adjusted under 35 U.S.C. 154(b) by 225 days.

(21) Appl. No.: 17/428,723

(22) PCT Filed: Feb. 7, 2020

(86) PCT No.: PCT/GB2020/000011
§ 371 (c)(1),
(2) Date: Aug. 5, 2021

(87) PCT Pub. No.: WO2020/161461
PCT Pub. Date: Aug. 13, 2020

(65) Prior Publication Data
US 2022/0046872 A1    Feb. 17, 2022

(30) Foreign Application Priority Data

Feb. 8, 2019    (GB) ...................................... 1901171

(51) Int. Cl.
*A01G 27/06* (2006.01)
*A01G 9/02* (2018.01)
*A01G 27/00* (2006.01)
(52) U.S. Cl.
CPC ............. *A01G 27/06* (2013.01); *A01G 9/023* (2013.01); *A01G 9/027* (2013.01); *A01G 27/008* (2013.01)

(58) Field of Classification Search
CPC .... A01G 27/06; A01G 27/008; A01G 27/005; A01G 9/023; A01G 9/027; A01G 9/025;
(Continued)

(56) References Cited

U.S. PATENT DOCUMENTS 1,213,331 A * 1/1917 Burleigh ................ A01G 27/02
47/79
1,217,239 A * 2/1917 Swartz ................. A01G 9/1423
261/DIG. 11
(Continued)

FOREIGN PATENT DOCUMENTS

FR         2715269 A1    7/1995
GB         2400119 A  * 10/2004  ............. A01G 27/02
(Continued)

OTHER PUBLICATIONS

Translation of KR 20110057709 (Year: 2011).*
(Continued)

*Primary Examiner* — Marisa V Conlon
(74) *Attorney, Agent, or Firm* — GrayRobinson, P.A.

(57)    ABSTRACT

A stackable modular planter includes an open top plant box with a base and four side walls adapted to receive a growing medium and plants. The open top plant box has a first width. An irrigation box below the open top plant box base has a second width larger than the first width. The irrigation box can be filled with irrigation fluid. An open top hopper on one side of the open top plant box on top of the irrigation box can receive irrigation fluid which drains into the irrigation box. An overflow drain aperture in the irrigation box lets excess irrigation fluid flow. When a plurality of the stackable modular planters are stacked above another planter, excess irrigation can flow from the overflow aperture into the hopper of the planter below.

19 Claims, 5 Drawing Sheets

(58) Field of Classification Search
CPC ...... A01G 9/022; A01G 9/028; A01G 9/1423;
A01G 9/045; A01G 31/06
See application file for complete search history.

(56) References Cited

U.S. PATENT DOCUMENTS

| | | | | | |
|---|---|---|---|---|---|
| 4,219,967 | A | * | 9/1980 | Hickerson | A01G 27/04 47/72 |
| 4,380,136 | A | * | 4/1983 | Karpisek | A01G 9/023 47/83 |
| 4,546,571 | A | * | 10/1985 | Scrivens | A01G 27/04 47/64 |
| 4,593,490 | A | * | 6/1986 | Bodine | A01G 9/022 47/79 |
| 5,826,375 | A | * | 10/1998 | Black | A01G 9/025 47/82 |
| 8,250,804 | B2 | * | 8/2012 | Chang | A01G 9/025 47/65.9 |
| 8,341,884 | B2 | * | 1/2013 | Rodrigues | A01G 9/025 47/82 |
| 8,683,744 | B2 | * | 4/2014 | Chang | A01G 9/027 47/41.01 |
| 9,307,701 | B2 | * | 4/2016 | Gosling | A01G 9/025 |
| 9,578,819 | B2 | * | 2/2017 | Prescott | A01G 9/025 |
| 9,769,991 | B2 | * | 9/2017 | Hashimoto | A01G 9/025 |
| 10,051,795 | B2 | * | 8/2018 | Fei | |
| 10,231,393 | B2 | * | 3/2019 | Nelson | A01G 9/025 |
| 2001/0000836 | A1 | | 5/2001 | Scannell | |
| 2009/0000189 | A1 | * | 1/2009 | Black | A01G 9/023 47/82 |
| 2010/0186295 | A1 | * | 7/2010 | Rodrigues | A01G 9/023 47/65.6 |
| 2015/0096229 | A1 | * | 4/2015 | Chang | A01G 9/025 47/79 |

FOREIGN PATENT DOCUMENTS

| | | | | | |
|---|---|---|---|---|---|
| KR | 20090002388 | U | * | 3/2009 | |
| KR | 20100030528 | A | * | 3/2010 | E02D 29/025 |
| KR | 20110057709 | A | * | 6/2011 | |
| KR | 101378283 | B1 | * | 3/2014 | A01G 9/025 |
| WO | 2014145549 | A1 | | 9/2014 | |
| WO | WO-2016034960 | A1 | * | 3/2016 | A01G 9/025 |

OTHER PUBLICATIONS

English translation of KR 101378283 (Year: 2014).*
Merged English translation of KR 20100030528 (Year: 2010).*
International Search Report of Apr. 17, 2020 for PCT/GB2020/000011.

* cited by examiner

STACKABLE MODULAR PLANTER

CROSS-REFERENCE TO RELATED APPLICATIONS

This is the U.S. National Stage application of International Application No. PCT/GB2020/000011, filed Feb. 7, 2020, which claims the benefit of priority from GB Application No. 1901171.4 filed Feb. 8, 2019. The entire contents of these prior applications are incorporated by reference herein.

FIELD

The present invention relates to a modular stackable planter.

BRIEF SUMMARY

According to the present invention there is provided a stackable modular planter comprising:

a) an open top plant box having a base, front wall, a rear wall and two side walls adapted to receive a growing medium and plants, said open top box having a first width, b) an irrigation box below the open top box base having a second width larger than the top box first width, said irrigation box adapted to be filled with irrigation fluid, c) an open top hopper on one side of the open top box on top of the irrigation box adapted to receive irrigation fluid which drains into the irrigation box, and d) an overflow drain aperture in the irrigation box through which excess irrigation fluid can flow wherein a pair of frames is provided, one at each side of the planter, the frames being arranged to stack on top of the frames of another planter, thereby providing means to stack one planter above another planter, the arrangement being such that, in use, when one planter is stacked above another planter, excess irrigation can flow from the overflow aperture into the hopper of the planter below.

Preferably the width of the open top box and the hopper is substantially equal to the width of the irrigation box.

Preferably the depth of the irrigation box is less than the depth of the open top box whereby a plant growing from the open top of a planter below can pass in front of an irrigation box of a planter above. Preferably a front wall of the open top box is tapered inwards from the top face of the box to the irrigation box. Preferably the top edge of a front wall of the open top box is lower than the top edge of a rear wall of the open top box. Preferably the rear face of the open top box is substantially planar with the rear face of the irrigation box.

Preferably the frames include projections to engage in recesses of an adjacent frame on another planter.

Preferably clips are provided to connect single stacked planters in side by side relationship. The clips may connect the frame on one planter to the frame of another adjacent planter.

In one embodiment the open top plant box and irrigation box are formed from a master open box with a floor between a top open face and the bottom of the master open box to create an upper open top plant box and a lower irrigation box, said hopper being provided between one end of the master open box and a partition spaced from said one end of the master open box and extending up from the floor, said open top plant box being formed between the partition and the other end of the master open box and the floor. Preferably the floor extends between said other end of the master open box and the partition leaving an aperture between the bottom of the hopper and the top of the irrigation box through which irrigation fluid can pass.

Preferably opposing side walls of the master box taper inwards. Preferably one side wall includes an aperture forming said overflow drain aperture. Preferably one of the frames cooperates with said one side wall to create a channel to direct irrigation fluid into the hopper of a planter stacked below.

Preferably the hopper includes a removable funnel section with a filter at its opening to allow any growing medium or plant debris to be cleaned away from the hopper.

Preferably a gauge is provided to determine the level of irrigation fluid in the irrigation box. The gauge may be float controlled.

Preferably one or more apertures are provided between the open top plant box and the irrigation box to receive one or more wicks to feed irrigation fluid to growing medium in the plant box. The invention extends to a plurality of planters according to any preceding aspect of the invention, stacked one above another by means of said frames.

BRIEF DESCRIPTION OF THE DRAWINGS

An embodiment of the invention will now be described with reference to the accompanying drawings in which.

DESCRIPTION OF EXAMPLE EMBODIMENT

Figure 1:
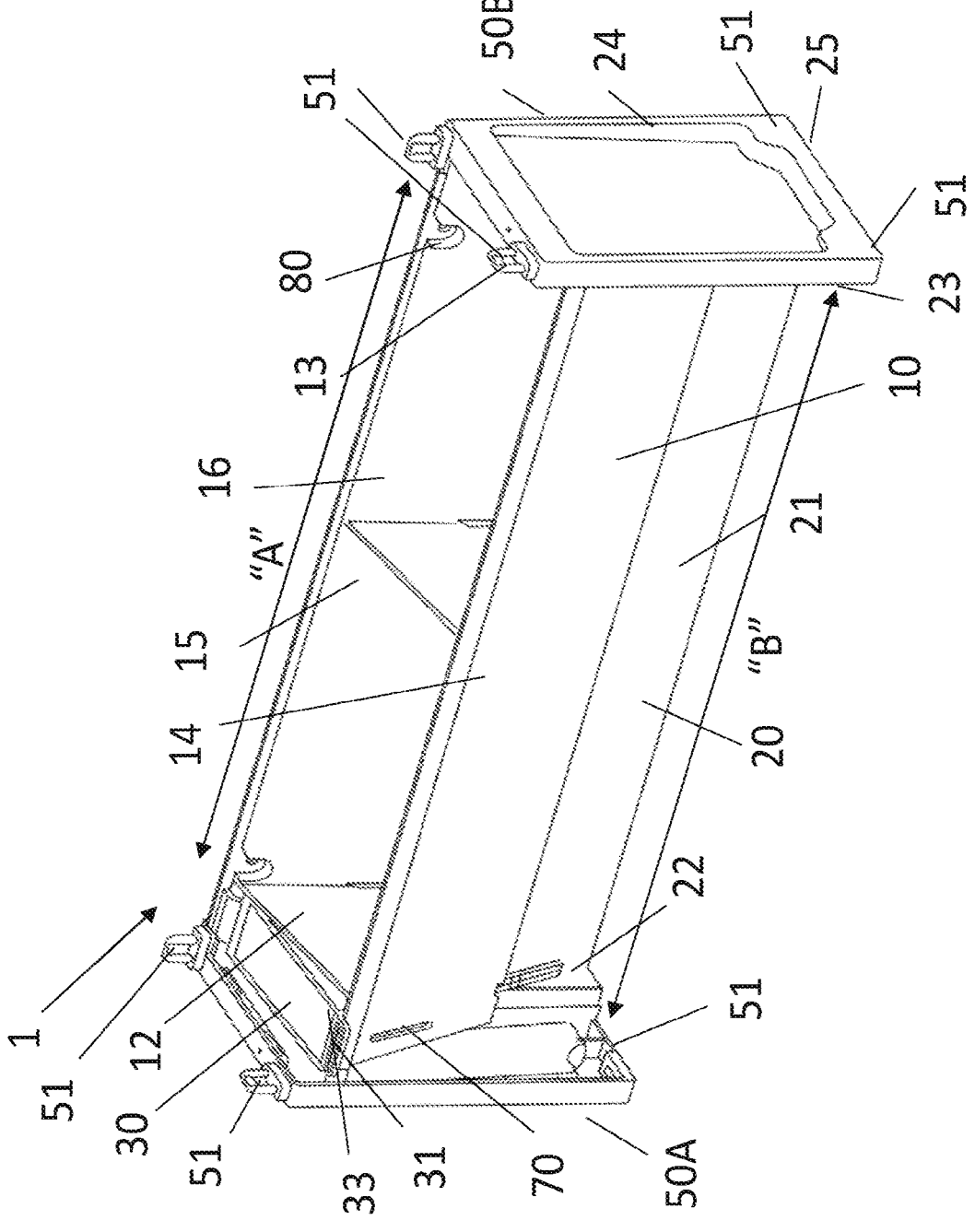
FIG. 1 shows a perspective view of a planter.
Figure 2:
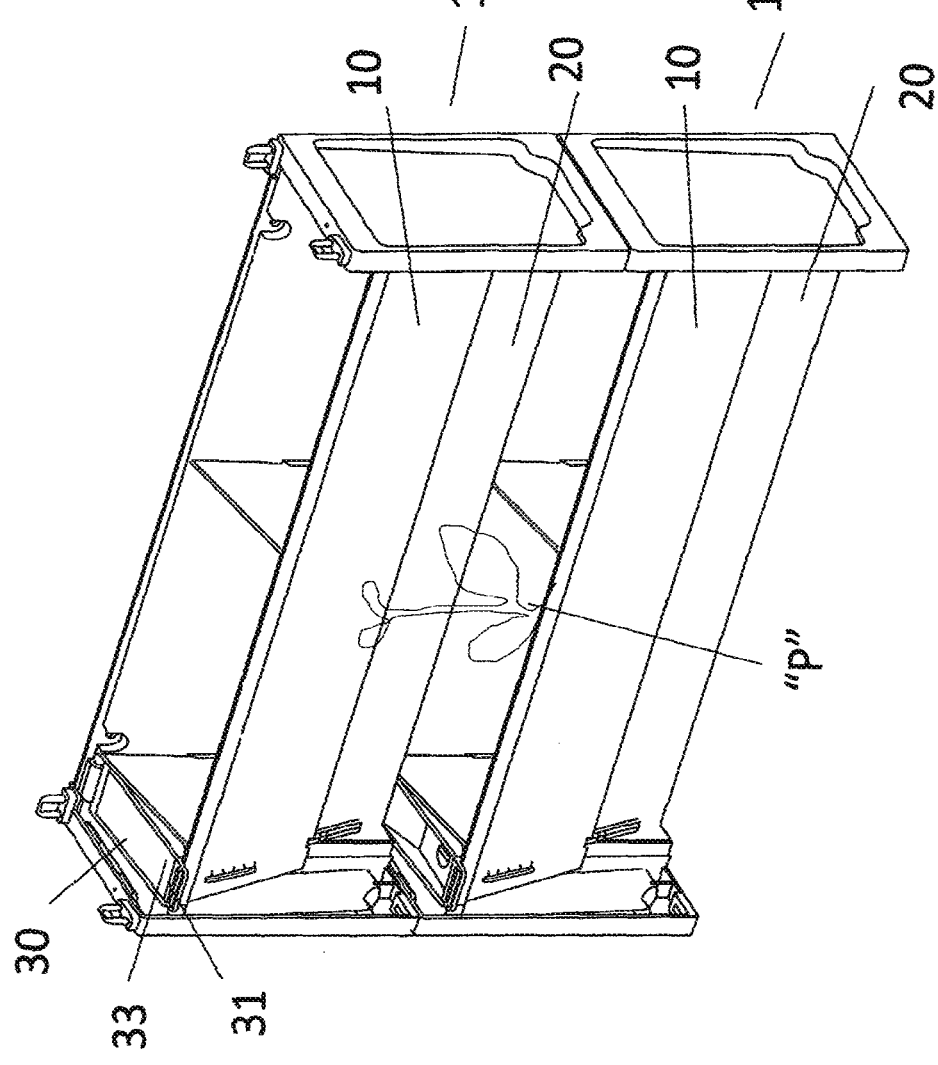
FIG. 2 shows a perspective view of a pair of planters stacked one above the other.
Figure 4:
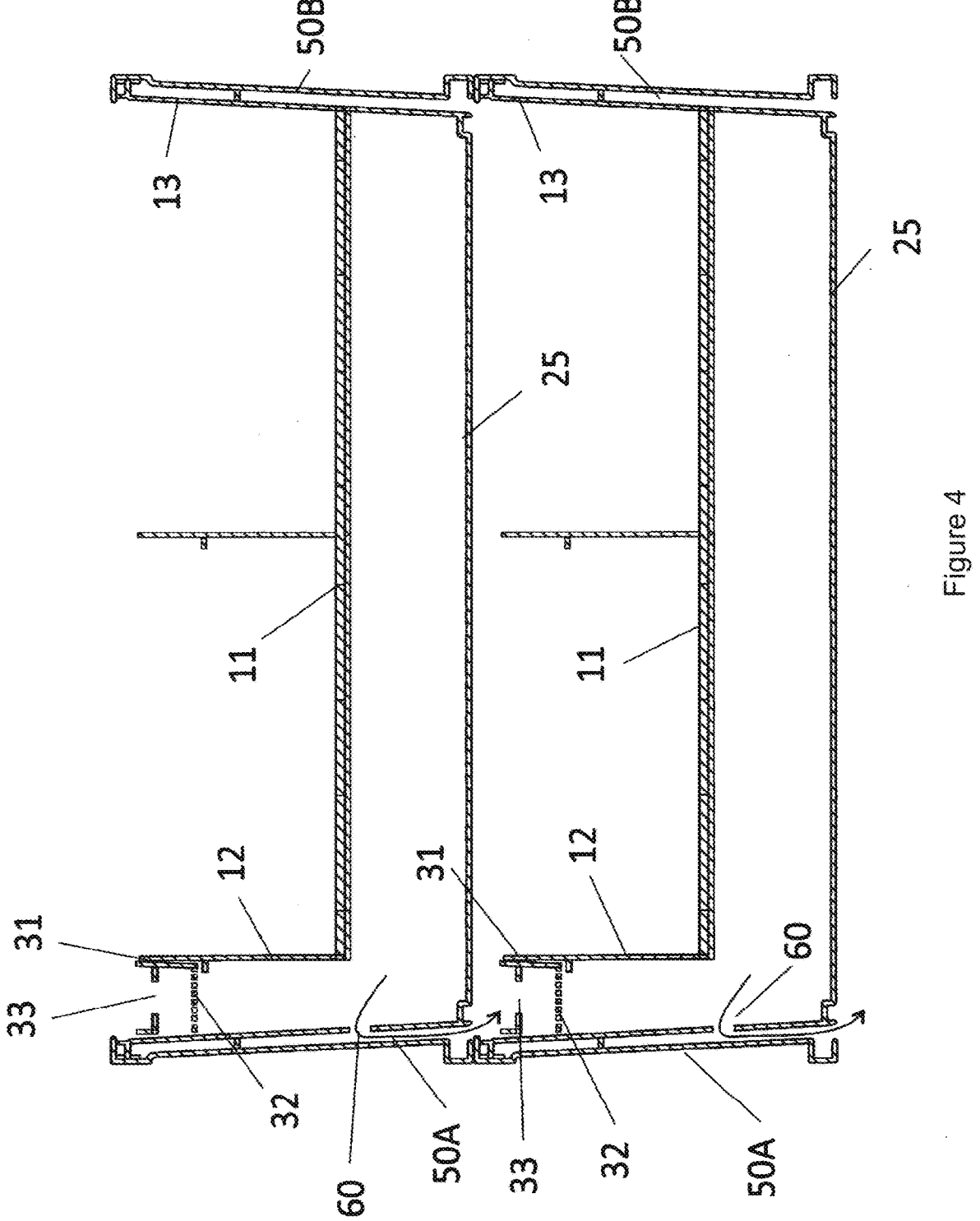
FIG. 4 shows a cross section view showing an overflow aperture and filling of an irrigation box.
Figure 5:
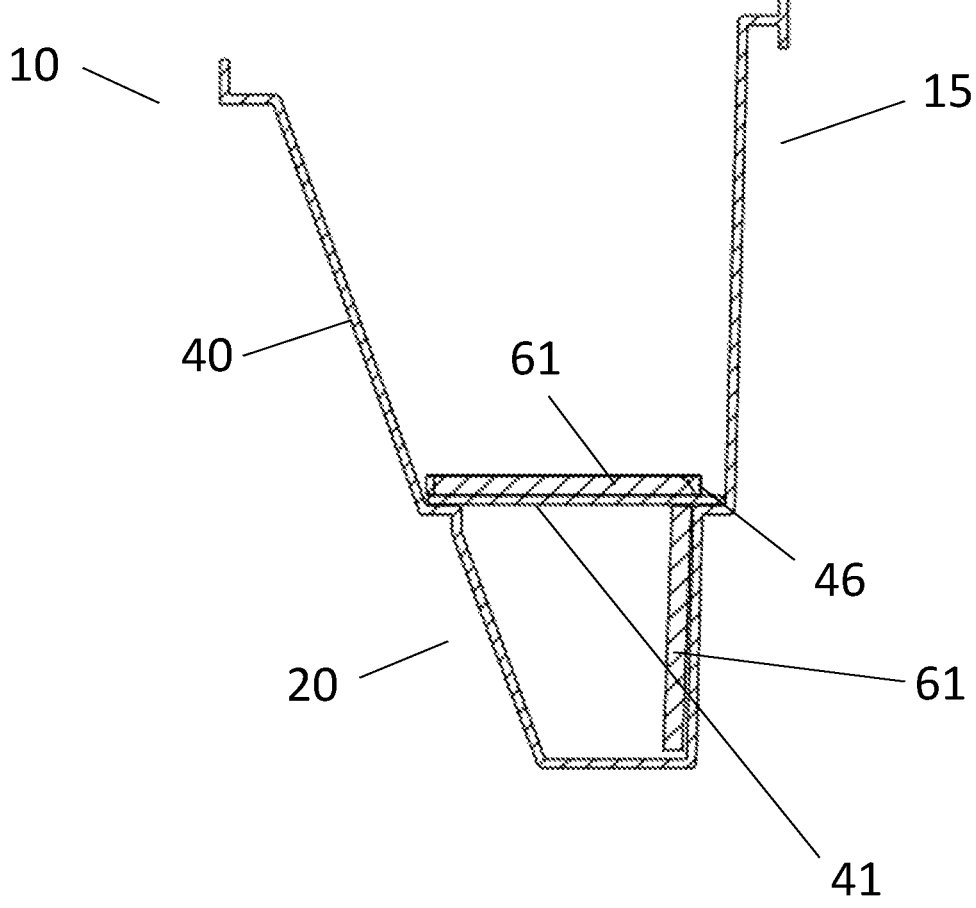
FIG. 5 shows a cross section of the planter with a wick.

Referring to FIGS. 1 and 2 of the drawings there is shown a stackable modular planter 1. Planter 1 has an open top plant box 10 having a base 11 (FIG. 4) and two opposing side walls 12,13 and a front and rear walls 14,15. The top face 16 of box 10 is open. Top plant box 10 is adapted to receive a growing medium and plants. Open top box has a first width "A". Front side wall 14 is tapered inwards from the top face of the box to an irrigation box 20 (see below).

The irrigation box 20 is provided below the open top box 10 base having a second width "B" larger than the top box first width "A". Irrigation box 20 is adapted to be filled with irrigation fluid. Box 20 has a front wall 21, side walls 22,23 and a rear wall 24, and a sealed base 25.

The depth of the irrigation box 20 from front to back is less than the depth of the open top box 10 whereby a plant "P" growing from the open top 16 of a planter below can pass in front of an irrigation box front wall 21 of a planter above (see FIG. 2). To further facilitate this, the top edge of the front wall 14 of the open top box 10 is lower than the top edge of the rear wall 15 of the open top box 10. The rear wall 15 of the open top box 10 is substantially planar with the rear wall 24 of the irrigation box 20.

An open top hopper 30 is on one side of the open top box 10 on top of the irrigation box 20 adapted to receive irrigation fluid. Preferably the width of the open top box 10 and the hopper 30 is substantially equal to the width of the irrigation box 20, so that fluid in the hopper drains into the irrigation box 20 immediately below. Hopper 30 is used to fill the irrigation box 20, e.g. using a watering can or water pipe nozzle.

3

Figure 3:
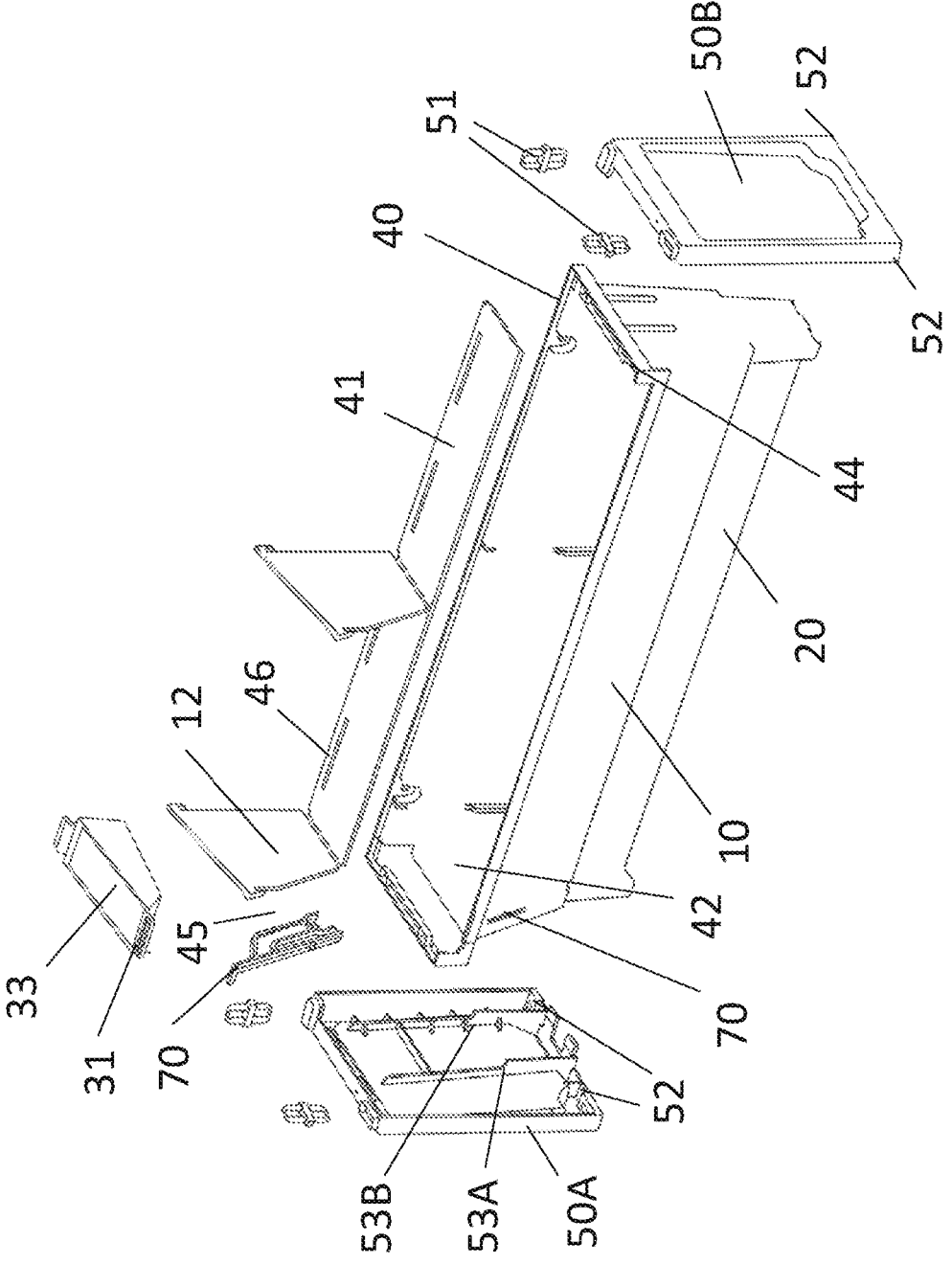
FIG. 3 shows an exploded view of the planter of FIG. 1.

As shown in FIG. 3, it is preferred that the top open face plant box 10 and irrigation box 20 are formed from a master open top faced box 40 with a floor 41 between the top open face and the bottom of the master open box to create an upper open top plant box and a lower irrigation box, said hopper 30 being provided between one end 42 of the master open box and a partition 43 spaced from said one end of the master open box and extending up from the floor 41. The plant box 10 is thus formed between the partition 43 and the other end 44 of the master open box and the floor. Preferably the floor 41 extends between said other end 44 of the master open box and the partition 43 leaving an aperture 45 between the bottom of the hopper and the top of the irrigation box through which irrigation fluid can pass. Preferably opposing side walls 42,44 of the master box taper inwards toward the bottom of the master box.

A pair of frames 50A,50B are provided either side of the planter 1, said frames providing means to allow one planter to stack above another planter. The frames include projections 51 to engage in recesses 52 of an adjacent frame on another planter.

Preferably clips are also provided (not shown) to connect single stacked planters in side by side relationship. The clips may connect the frame on one planter to the frame of another adjacent planter. The frames 50A,50B provide means to stack one planter above another planter.

An overflow drain aperture 60 is provided in the irrigation box through which excess irrigation fluid can flow. The drain aperture is provided in side wall 42 of master box 40 (side wall 22 of irrigation box 20). Frame 50A has opposing walls 53A,53B which cooperate with side wall 42 (side wall 22 of irrigation box 20) to create a channel to direct irrigation fluid into the hopper of a planter stacked below. Thus in use, when one planter is stacked above another planter, excess irrigation can flow from the overflow aperture into the hopper of the planter below.

Preferably one or more apertures 46 are provided in floor 41 between the plant box and the irrigation box to receive one or more wicks 61 to feed by capillary action irrigation fluid to growing medium in the plant box.

Preferably a gauge 70 is provided to determine the level of irrigation fluid in the irrigation box. The gauge may be float controlled.

Preferably the hopper 30 includes a removable funnel section 31 with a filter 32 (see FIG. 4)) to allow any growing medium or plant debris to be cleaned away from the hopper. When planting the planter or removing plants there is a tendency for growing medium (e.g. soil) to fall into the hopper [is] if the funnel section 31 is not in situ. Funnel section 31 may have a hole 33 leading to the filter 32 which then leaks irrigation fluid into the hopper. Funnel section 31 is removable to allow it and its filter 32 to be cleaned. This keeps the irrigation box clean of debris.

It is envisaged that a user can purchase a number of planters stacking them both vertically and in side by side relationship to create a desired area for growing plants. The planters may be stacked several high and be free standing, but if desired fixings in cut-outs 80 (see FIG. 1) can be used to secure them to a vertical surface for greater structural strength.

The invention may take a form different that specifically described. For example the top plant box 10, irrigation box 20 and hopper 30 could be three separate components joined together rather than being formed from a master box 40 as shown in FIG. 3.

Further modifications will be apparent to those skilled in the art without departing from the scope of the present invention.

The invention claimed is:

1. A stackable modular planter comprising:
   a) an open top plant box having a base, a front wall, a rear wall and two side walls adapted to receive a growing medium and plants, said open top plant box having a first width,
   b) an irrigation box below the open top plant box base and having a second width larger than the first width, said irrigation box adapted to be filled with irrigation fluid,
   c) an open top hopper on one side of the open top plant box on top of the irrigation box, the open top hopper adapted to receive the irrigation fluid which drains into the irrigation box,
   d) an overflow drain aperture in the irrigation box through which excess irrigation fluid can flow, and
   e) a pair of frames, one at each side of the stackable modular planter, said frames being adapted to allow one stackable modular planter to stack directly above another stackable modular planter in a free-standing configuration,
   wherein a depth of the irrigation box from front to rear is less than the depth of the open top box from front to rear, whereby a plant growing from the stackable modular planter directly below can pass in front of the irrigation box of the stackable modular planter directly above; and
   whereby in use, when one stackable modular planter is stacked directly above another stackable modular planter, excess irrigation fluid can flow from the overflow drain aperture into the open top hopper of the stackable modular planter directly below without passing through the open top plant box of the stackable modular planter below.

2. The stackable modular planter of claim 1, wherein a combined width of the first width of the open top plant box and a width of the open top hopper is substantially equal to the second width of the irrigation box.

3. The stackable modular planter of claim 1, wherein said front wall of the open top plant box is tapered inwards from a top face of the open top plant box to the irrigation box.

4. The stackable modular planter of claim 1, wherein a top edge of said front wall of the open top plant box is lower than a top edge of said rear wall of the open top plant box.

5. The stackable modular planter of claim 1, wherein the rear wall of the open top plant box is substantially planar with a rear wall of the irrigation box.

6. The stackable modular planter of claim 1, wherein the frames include projections to engage in recesses of an adjacent frame on another stackable modular planter stacked directly above.

7. The stackable modular planter of claim 1, wherein the open top plant box and irrigation box are formed from a master open box with a floor between a top open face and a bottom of the master open box to create an upper open top plant box and a lower irrigation box, said open top hopper being provided between one end of the master open box and a partition spaced from said one end of the master open box and extending up from the floor to define one of said side walls, said open top plant box being formed between the partition and the other end of the master open box and the floor.

8. The stackable modular planter of claim 7, wherein the floor extends between said other end of the master open box and the partition leaving an aperture between a bottom of the open top hopper and a top of the irrigation box through which irrigation fluid can pass.

9. The stackable modular planter of claim 7, wherein opposing side walls of the master open box taper inwards.

10. The stackable modular planter of claim 7, wherein one of the side walls of the master open box includes an aperture forming said overflow drain aperture of the irrigation box.

11. The stackable modular planter of claim 10, wherein one of said frames cooperates with said one side wall of the master open box to create a channel to direct said irrigation fluid into the open top hopper of the stackable modular planter stacked directly below the other stackable modular planter.

12. The stackable modular planter of claim 1, wherein the open top hopper includes a removable funnel section with a filter at its opening to allow any growing medium or plant debris to be cleaned away from the open top hopper.

13. The stackable modular planter of claim 1, wherein a gauge is provided to determine a level of irrigation fluid in the irrigation box.

14. The stackable modular planter of claim 13, wherein the gauge is float controlled.

15. The stackable modular planter of claim 1, wherein one or more wick apertures are provided between the open top plant box and the irrigation box to receive one or more wicks to feed said irrigation fluid to the growing medium in the open top plant box.

16. The stackable modular planter of claim 1, wherein the side walls extend from the front wall to the rear wall and respective frames of the pair of frames extend adjacent the respective side wall between the front wall and the rear wall.

17. The stackable modular planter of claim 1, wherein:

the side walls extend from the front wall to the rear wall and respective frames of the pair of frames extend adjacent the respective side wall between the front wall and the rear wall; and said frames are adapted to allow one stackable modular planter to stack directly above another stackable modular planter in a free-standing configuration by extending adjacent the respective side wall between the front wall and the rear wall.

18. The stackable modular planter of claim 1, wherein the side walls extend from the front wall to the rear wall and the first width is measured from one side wall to the other side wall.

19. The stackable modular planter of claim 1, wherein the side walls extend from the front wall to the rear wall and the open top hopper is positioned adjacent one side wall between the front wall and the rear wall.

\* \* \* \* \*